June 30, 1970   M. W. HOTT, JR., ET AL   3,517,697
PRESSURE REGULATING VALVE
Filed Dec. 13, 1967   3 Sheets-Sheet 2

INVENTOR.
Melville W. Hott Jr.
BY Fred A. Kobzschuk
Wood, Herron & Evans
ATTORNEY'S June 30, 1970     M. W. HOTT, JR., ET AL     3,517,697

PRESSURE REGULATING VALVE

Filed Dec. 13, 1967     3 Sheets-Sheet 3

INVENTOR.
Melville W. Hott Jr.
BY Fred A. Holzschuh
Stood, Herron and Evans
ATTORNEY'S

United States Patent Office 3,517,697
Patented June 30, 1970

3,517,697
PRESSURE REGULATING VALVE
Melville W. Hott, Jr., and Fred A. Holzschuh, Cincinnati, Ohio, assignors to Richards Industries, Inc., Cincinnati, Ohio, a corporation of Ohio
Filed Dec. 13, 1967, Ser. No. 690,182
Int. Cl. F16k 11/06, 39/04, 3/00
U.S. Cl. 137—625.33      8 Claims

ABSTRACT OF THE DISCLOSURE

A pressure regulating valve in which flow is controlled by a stationary plate and a slidable disc in facial contact with one another. The disc and plate are each provided with a series of apertures aligned in one position of the disc to permit flow through the valve. When the disc is in a second position in which the apertures are not aligned, the valve is sealed to prevent fluid flow. The disc is shifted by a reciprocating stem connected to a diaphragm having pressure chambers above and below it. A return spring applies an upward force to the stem urging the stem toward the diaphragm and the disc to its closed position. A balance spring applies a downward force to the stem opposing the return spring force in excess of the static frictional resistance force on the disc, but less than the force of the return spring.

BACKGROUND OF THE INVENTION

This invention relates to pressure regulating valves and is particularly directed to an improved pressure regulating valve of the sliding gate type.

In general, pressure regulating valves of the type with which the present invention is concerned are utilized to maintain a predetermined pressure in a fluid line which may be conveying a gas, such as air; or a liquid, such as water or oil. The valve includes a hollow body providing a fluid conduit therethrough. Flow through the valve is controlled by the cooperation of a stationary plate and movable disc. The disc and plate have exceedingly flat faces in facial abutment with one another. Each of these members includes a plurality of elongated apertures or ports. When the slidable plate is positioned so that the apertures in both plates are in alignment, fluid flows in a straight path through the valve. However, when the disc is positioned so that the ports in the disc and plate are not in alignment, the two flat surfaces of the disc and plate overlap and a fluid-tight seal is provided.

In a valve of this type, the disc is shifted by a nose, pin or the like, carrier by a reciprocating stem and extending through a slot in the stationary plate. The upper end of the stem is adapted to be shifted by a transverse diaphragm having pressure chambers above and below. A return spring engages the lower end of the stem to normally push the stem upwardly against the "control" pressure above the diaphragm. This "control" pressure is governed through a pilot valve in accordance with the main main line pressure to be controlled. For example, if the downstream pressure is to be maintained at a selected or "set" value, control pressure is applied above the diaphragm whenever the downstream pressure is below this value. As a result, the stem and disc are shifted downwardly to open the main valve and admit pressure to the downstream side. When, however, the downstream pressure reaches the selected or "set" value, pressure is removed from above the diaphragm and the return spring shifts the stem and disc upwardly to close the valve.

While valves of this type provide many advantages in operation, they have in the past been subject to certain limitations which have prevented their use in some installations. In the first place, such valves have been limited to relatively low pressure drops, for example, pressure drops of the order of 50 pounds per square inch. This limitation is imposed because of the exceedingly high force required to shift the disc when a large pressure differential exists across the disc and plate.

Another limitation of prior art valves of this type is that they have had limited rangeability, i.e. a relatively low ratio of maximum capacity to minimum capacity. For example, in typical valves of this type, rangeability has been of the order of 20–1. Such a valve could control fluid flowing at any rate from a minimum rate of say 5 gallons per minute to a maximum rate of 100 gallons per minute. This limited variation in flow rates over which pressure can be controlled renders these valves impractical for use in certain installations.

It is one of the principal objects of the present invention to provide a sliding gate-type pressure regulating valve in which these shortcomings are substantially overcome. More particularly, a pressure regulating valve of the present invention can be operated with a pressure drop of the order of three times as great as the pressure drop of a similiar valve of the prior art. Thus, if a similar valve were limited to installations having a 50 pound pressure drop, a valve of the present invention can be operated with a 150 pound pressure drop. Moreover, the rangeability of the pressure regulator is increased from a ratio of the order of 20 to a ratio of from 85 to 500.

A valve constructed in accordance with the present invention comprises the same basic elements as utilized in prior art sliding gate valves including a stationary ported plate, a cooperating movable disc, a diaphragm operated stem connected to the disc and a return spring for biasing the stem in one direction. In addition, however, it is the concept of the present invention to provide a second, or "balance" spring which acts on the stem in the opposite direction of the return spring and in the same direction as the "control" pressure force above the diaphragm. When the disc is in its closed position, the force of this "balance" spring is slightly greater than the static friction force resisting movement of the sliding disc and is less than the total force of the return spring.

We have determined that the provision of this "balance" spring minimizes the force required to shift the disc and thus facilitates operation of the valve over a substantially greater pressure range. Additionally, we have determined that the provision of a balance spring substantially reduces overshoot inherent in these valves and thus provides a more accurate pressure regulation than was previously possible. Still further, the addition of a balance spring facilitates regulation of pressure over a much wider range of flow rates than was heretofore practical.

These and other objects and advantages of the present invention will be more readily apparent from a consideration of the following detailed description of the drawings illustrating a preferred embodiment of the invention.

Figure 1:
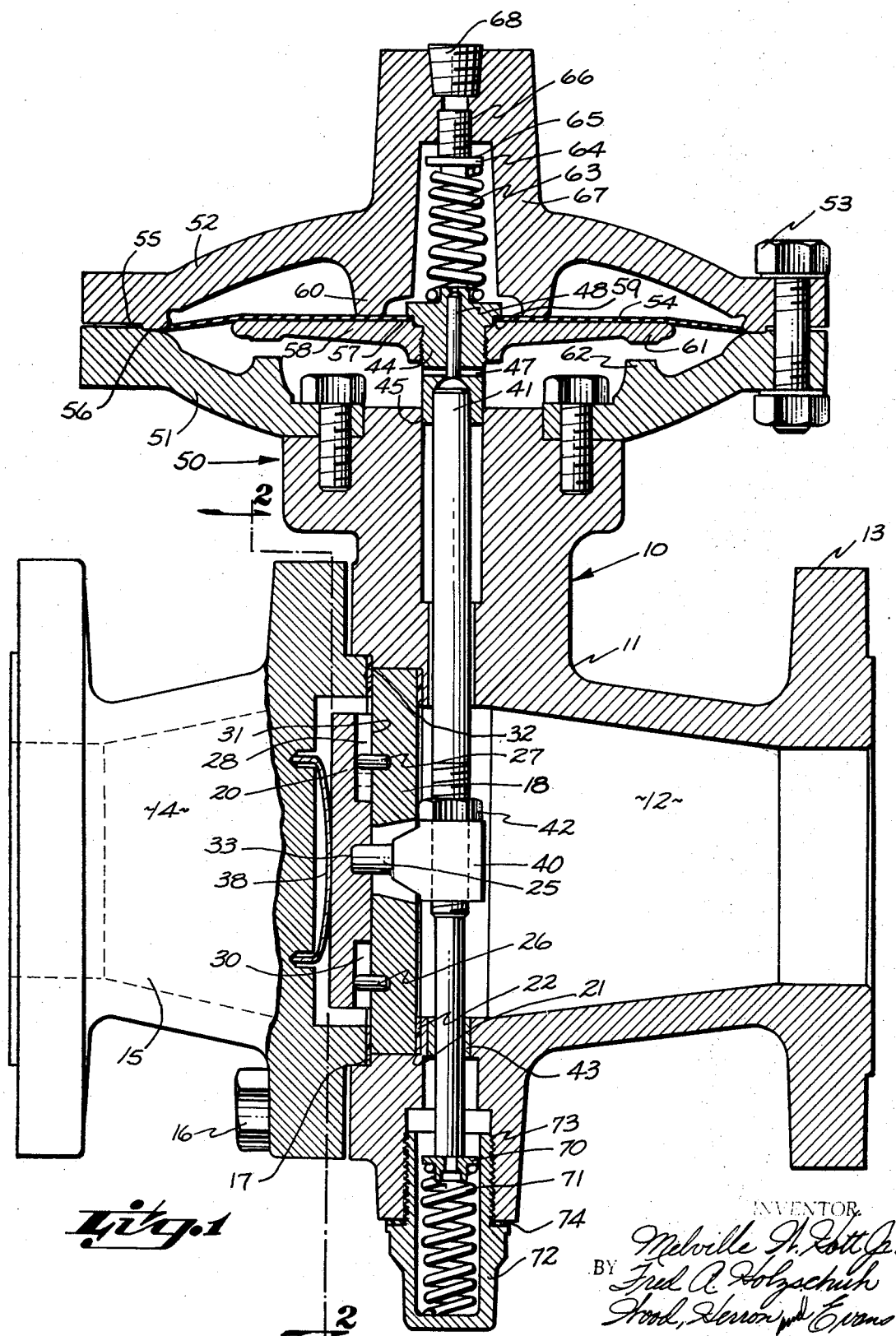
FIG. 1 is a vertical cross-sectional view taken through a valve constructed in accordance with the principles of the present invention.

The overall construction of one preferred form of pressure regulating valve 10 embodying the principles of the present invention is shown in FIG. 1. As there shown, the valve comprises a main body section 11 formed of any suitable material, such as cast iron. The body section 11 includes an internal fluid passageway 12 and an end mounting flange 13 for connecting the valve to a fluid line. The valve further comprises a flanged cap member 14 which is secured to the main valve member 10 and includes a fluid passageway 15 in communication with fluid passageway 12. The cap 14 and body 11 are joined together in any suitable manner, such as by means of bolts 16, which tighten the cap member against an annular sealing gasket 17. When the valve 10 is installed in a line, cap member 14 is connected to the inlet or upstream side of the line, and flange 13 is connected to the outlet or downstream side of the line.

Flow through the valve is controlled by the cooperation of a stationary plate member 18 and a movable disc member 20. Plate member 18 is mounted in an annular recess 21 formed in the body member, a suitable gasket member 22 being compressed between a shoulder of the recess and the rear face of the plate.

Figures 4, 5, 6:
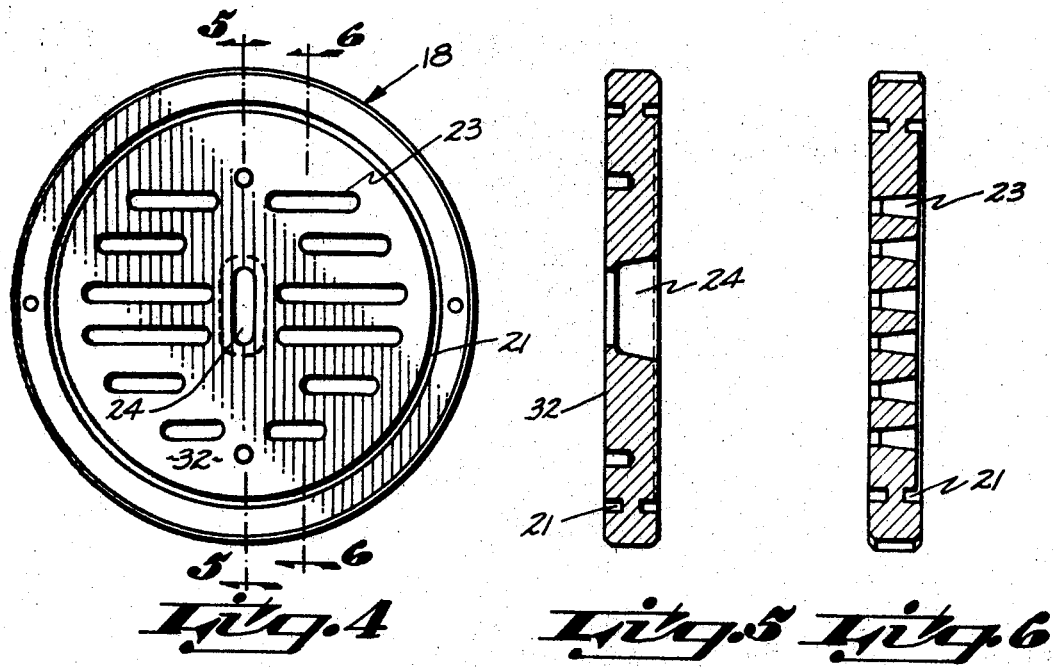
FIG. 4 is a plan view of a plate member of the valve.
FIG. 5 is a cross-sectional view taken along line 5—5 of FIG. 4.
FIG. 6 is a cross-sectional view taken along line 6—6 of FIG. 4.

As is best shown in FIGS. 4 and 5, the plate 18 is provided with two sets of horizontally extending elongated apertures or ports 23 symmetrically disposed on opposite sides of the vertical center line of the plate. The stationary plate 18 is also provided with an elongated vertical opening 24 adapted to receive disc operating pin 25. Plate 18 carries two stationary guide pins 26 and 27 which are received in vertical slots 28 and 30 of the movable ported disc and function to guide that disc in its vertical movements. The movable disc member has a face 31 disposed in abutment with front face 32 of the plate member. These cooperating faces are respectively lapped to extreme flatness and are effective to provide a fluid seal when the ports in disc 20 and plate 18 are not in registry.

Figures 2, 3:
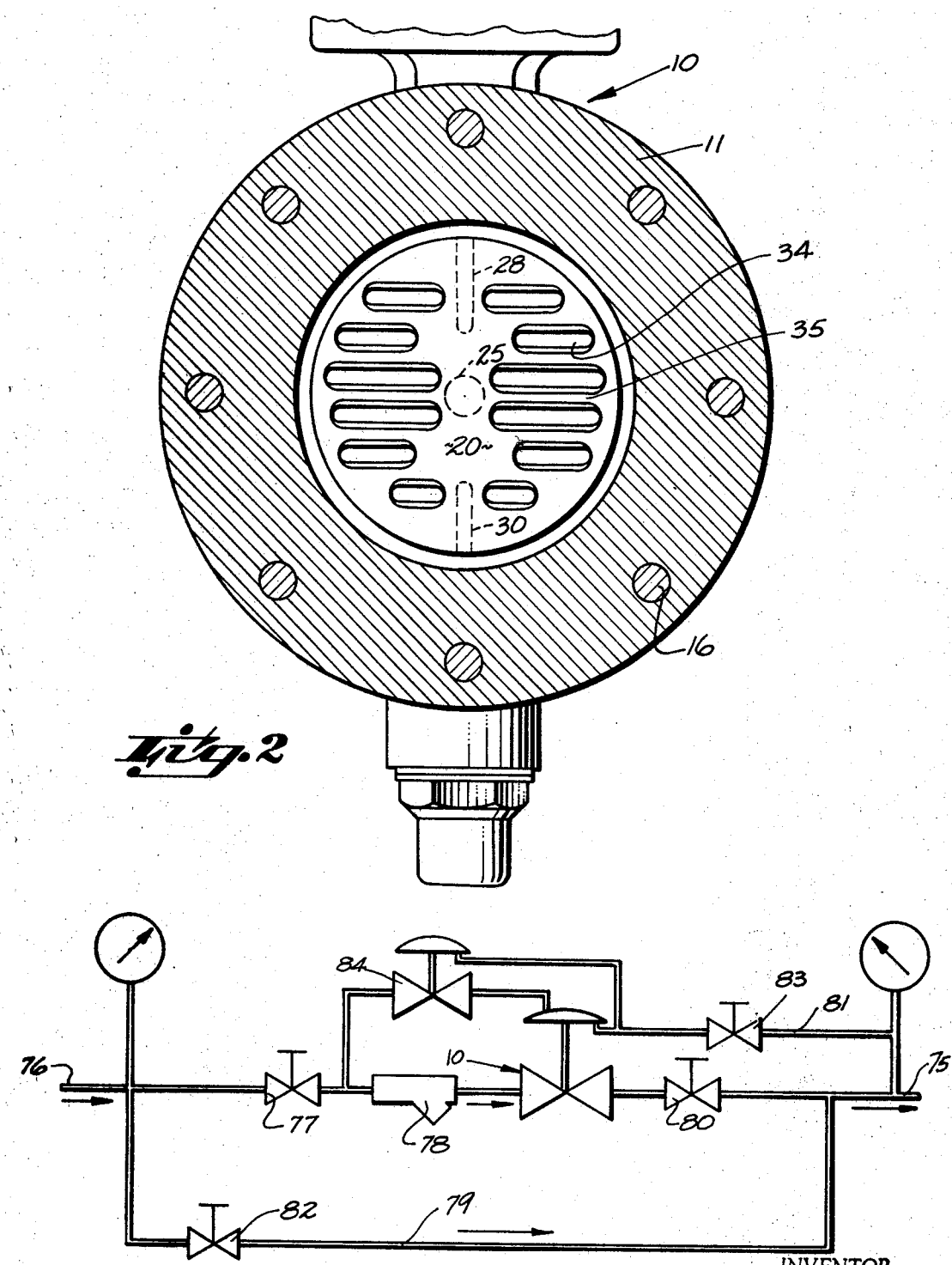
FIG. 2 is a cross-sectional view taken along line 2—2 of FIG. 1.
FIG. 3 is a schematic view of one typical fluid system embodying the present valve.

Movable disc 20 is provided with a central recess 33 for receiving stem operating pin 25. The disc is further provided with two sets of parallel horizontal flow openings or ports 34 adapted to be brought into registry with ports 23 in stationary plate member 18. As shown in FIG. 2, openings 34 are preferably tapered outwardly from face 31 to the opposite face 35. The openings 34 in the disc member are held in parallel relationship to openings 23 in the plate member by the interengagement of guide pins 26 and 27 in vertical slots 28 and 30 in the disc. Disc 20 is urged against plate 18 by means of bowed springs 38.

When disc 20 is in its lowermost position, flow openings 34 in the disc are aligned with flow openings 23 in plate 18. Consequently, in this position the valve 10 is open and fluid can flow through the valve from inlet passageway 15 to outlet passageway 12. When the disc 20 is in its elevated position, however, openings 34 and 23 are completely out of registry with one another so that a fluid-tight seal is obtained between the abutting faces 31 and 32 of the disc and plate. In this position, the valve is closed and the flow of fluid is completely blocked.

As shown in FIG. 1, disc 20 is positioned through its engagement with pin 25. This pin is in turn carried by a sleeve portion 40 threadably engaging the stem 41, the sleeve portion 40 being locked in position upon the stem by means of a lock nut 42. The lower end of vertical stem 41 is slidably journalled in a bushing 43. The upper end of the stem is disposed in a bore in a retainer member 44 having vertical and transverse bores 48 and 47.

This retainer member 44 is slidably supported in an enlarged vertical bore 45 formed in body 10. An upper flange 50 surrounds this bore and supports a lower dish-shaped bonnet member 51. Lower bonnet member 51 in turn carries an upper bonnet member 52. These bonnet members are of circular outline configuration and are secured together in any suitable manner, such as by means of bolts 53 passing through the peripheral flange portions of the bonnet sections. A flexible diaphragm 54 extends between the upper and lower bonnet sections with the periphery of the diaphragm being tightly clamped between cooperating shoulders 55 and 56 formed on the upper and lower bonnet sections respectively.

The diaphragm may be formed of any suitable strong flexible material, for example, rubber, plastic, thin metal or the like. The center portion of the diaphragm is clamped and sealed between an upper shoulder 59 formed on retainer member 44 and a diaphragm plate 58 which is threaded over the retainer member and abuts the underside of the diaphragm. Upward movement of diaphragm 54 and stem 41 is limited by a depending annular flange 60 formed on the interior of upper bonnet 52. Downward movement of the diaphragm and stem is limited by the engagement of a lower flange 61 on plate 58 with an upwardly extending cooperating flange 62 formed on the lower bonnet member 51. It will be understood that conventional fluid connections (not shown) are made through bonnet sections 52 and 51 to the spaces above and below the diaphragm 54.

In addition to these elements, the present valve 10 comprises an upper or "balancing" spring member 63. This coil spring is compressed between retainer member 44 and a guide 64 carried by the lower end of adjusting screw 65. Adjusting screw 65 threadably engages a bore 66 formed in a dome-like center portion 67 of bonnet member 52. Access to the adjusting screw is attained by removal of plug member 68 which threadably engages a large portion of bore 66.

The lowermost end of stem 41 carries a spring engaging guide plate 70 press-fit over a lug formed on the end of stem 41. This guide member engages the upper end of a lower or "return" coil spring 71 compressed between the guide and a lower cap 72. Cap 72 is threaded into a lower vertical bore 73 formed in main body 10, a gasket 74 being disposed between the cap and body to provide a fluid-tight seal.

The valve shown in FIG. 1 is normally closed, i.e. the force of "return" spring 71 is greater than that of "balance" spring 63. Thus, the return spring normally urges stem 41 and disc 20 to the uppermost positions. When disc 20 is in its elevated position, ports 34 in the disc and 23 in the plate are not aligned and a fluid seal is obtained between abutting faces 31 and 32 of the disc and plate. When disc 20 is in its closed or uppermost position, the force of balance spring 63 is greater than the static friction force on disc 20, resisting downward movement of the disc. As a result, the upper spring 63 provides a force to balance this friction force and, in addition, a portion of the upper spring force balances a portion of the return spring force.

It is considered that a complete understanding of the operation of the device can best be had by reference to FIG. 3 which shows a typical installation. It will, of course, be understood that the present pressure regulating valves can be used in many different ways and that the fluid system shown in FIG. 3 is merely exemplary.

As there shown, the main valve 10 is utilized to control the pressure on the downstream side 75 in a main conduit. The upstream side 76 of this conduit is connected through an auxiliary shutoff valve 77 and a strainer 78 to the inlet side of valve 10. The outlet side of the valve is connected through a shutoff valve 80 to the downstream conduit section 75. Valves 77, 10 and 80 are bypassed by a bypass line 79 provided with a shutoff valve 82.

A return or control line 81 is tapped from downstream line 75. This control line is connected through a shutoff valve 83 to the space below diaphragm 54. Control line 81 is also connected to the space beneath the diaphragm of a pilot valve 84. The construction of the pilot valve 84 constitutes no part of the present invention and the construction is indeed well-known in the prior art. In general, however, the pilot valve can be in the form of a diaphragm operated sliding gate valve of the same general type shown in this application. The inlet side of the pilot valve is connected to line 76, while the outlet side is connected to the space above diaphragm 54 in main valve 10.

In operation, main valve 10 is normally closed as explained above. The upstream pressure from conduit 76 is applied to the pilot valve which is normally open in a pressure reducing application. As a result, the upstream pressure is applied to the space above diaphragm 54 in main valve 10. This force tends to push stem 41 downwardly. When the force exerted on the stem by this pressure slightly exceeds the remaining upward force of the return spring (the static friction on disc 20 and a portion of the return spring force being balanced by upper balance spring 63), downward movement of the disc begins. As the disc starts to move downwardly, the static frictional resistance of the disc in movement diminishes rapidly to the dynamic resistance value so that nearly all of the force of the upper spring 63 works with the pilot pressure exerted on the diaphragm to compress the lower return spring 71.

As the stem continues to move downwardly, the force of lower spring 71 increases with compression; while the force exerted by the upper spring 63 decreases due to the elongation of the spring. At the same time, the flow openings in disc 20 and plate 18 are brought into alignment so that fluid flows through the valve and the downstream pressure rises. Downward movement of the disc 20 continues until the downward force exerted on the stem 41 by the diaphragm 54 and the balance spring is balanced by the dynamic resistance of the disc 20 plus the upward upper force of return spring 71.

As the fluid flows through valve 10, the pressure in the downstream conduit section 75 increases. This downstream pressure is fed back through line 81 to the space beneath diaphragm 54 in the main frame and the space beneath the diaphragm in the pilot valve 84. When the downstream pressure raises to the preselected value, or "set point," it overcomes the bias spring force in the pilot valve and closes that valve. When the valve 84 is closed, flow to the main valve diaphragm 54 to the space above the main valve diaphragm is stopped and the pressure above the main valve diaphragm is bled off downstream through ports 47 and 48, the space below the diaphragm and connection 81. The force of return spring 71 predominates, i.e. exceeds the static friction on disc 20 and the balance spring force, causing stem 41 and disc 20 to be shifted upwardly closing the main valve.

It will be appreciated that in the valve operation just described, there is a tendency of the disc to overshoot its final position when the valve is opened due to the difference between the static resistance force of the disc movement and the diaphragm resistance force. The amount of this overshoot is approximately equal to the spring deflection, or compression, required to balance the difference between the static and dynamic resistances of the plate.

In the preferred embodiment, balance spring 63 and return spring 71 are of equal spring rate, although the two springs act in opposition to one another. Their combined effect thus produces a spring rate twice as large as the rate of each individual spring. In other words, for a given amount of downward movement of the stem, the net increase in upward spring force exerted on the stem is twice as great as it would be if only the upper or lower spring were used alone. This is not disadvantageous, however, since the large static frictional forces have been overcome. Rather, it is quite advantageous since as a consequence of this increase in spring rate, the amount of overshoot is reduced one-half. This helps the present valve provide extremely accurate regulation. Moreover, substantially the same final load on the return spring is obtained despite the presence of the upper, or balance, spring. Consequently, the minimum differential pressure across the valve which can effectively operate the valve is kept at a low value.

On the closing or upward movement of the disc, the force differential of the return and balance springs diminishes rapidly due to the elongation of the return spring and compression of the balance spring. Thus, there is a smooth or cushioned closing action of the valve plate rather than the sharp, rapid action inherent in prior art valves of this type.

Having described our invention, we claim:

1. A pressure regulating valve comprising a hollow valve body having a fluid passageway therethrough, a fixed plate mounted transversely of said passageway, said fixed plate having a plurality of apertures formed therein, a disc member disposed in facial abutment with said fixed plate, said disc member being mounted for reciprocating movement and having a plurality of apertures formed therein, a reciprocating stem, means interconnecting said stem and said disc, said stem being adapted to position said disc in an open position in which the apertures in said disc are in registry with the apertures in said plate, and in a closed position in which the apertures in said disc and plate are completely out of registry, a diaphragm, means interconnecting said diaphragm to one end of said stem, a first fluid pressure space on the side of said diaphragm remote from said stem, said first fluid pressure space being adapted for connection to upstream pressure, a second fluid pressure space on the side of said diaphragm adjacent to said stem, said second fluid pressure space being adapted for connection to control pressure, a return spring interconnected with a portion of said stem remote from said diaphragm and effective to urge said stem toward said diaphragm and to urge said disc toward said closed position, and a balance spring effective to apply a force to said stem in opposition to the force applied by said return spring.

2. The valve of claim 1 in which said balance spring exerts a force on said stem when said disc is in its closed position greater than the static friction force resisting movement of said disc but less than the force of said return spring.

3. The valve of claim 1 in which said balance spring and said return spring have substantially the same spring rate.

4. The valve of claim 2 in which said balance spring and said return spring have substantially the same spring rate.

5. A pressure regulating valve comprising a hollow valve body having a fluid passageway therethrough, a fixed plate mounted transversely of said conduit, said fixed plate having a plurality of apertures formed therein, a disc member disposed in facial abutment with said fixed plate, said disc member being mounted for reciprocating movement and having a plurality of apertures formed therein, a reciprocating stem, means interconnecting said stem and said disc, said stem being adapted to position said disc in an open position in which the apertures in said disc are in registry wth the apertures in said plate, and in a closed position in which the apertures in said disc and plate are completely out of registry, a diaphragm extending transversely of said stem, means interconnecting said diaphragm to one end of said stem, a first fluid pressure space on the side of said diaphragm remote from said stem, said first fluid pressure space being adapted for connection to upstream pressure, a second fluid pressure space on the side of said diaphragm adjacent to said stem, said second fluid pressure space being adapted for connection to control pressure, a return spring disposed in engagement with the opposite end of said stem effective to urge said stem toward said diaphragm, said return spring normally positioning said disc in a closed position, and a balance spring disposed within said first pressure space and being effective to apply a force to said stem in opposition to the force applied by said return spring.

6. The valve of claim 5 in which said balance spring exerts a force on said stem when said disc is in its closed position greater than the static friction force resisting movement of said disc but less than the force of said return spring.

7. The valve of claim 5 in which said balance spring and said return spring have substantially the same spring rate.

8. The valve of claim 6 in which said balance spring and said return spring have substantially the same spring rate.

References Cited
UNITED STATES PATENTS

| | | | |
|---|---|---|---|
| 2,154,901 | 4/1939 | Hulse et al. | 137—505.18 |
| 2,158,436 | 5/1939 | Shaw | 251—61.4 |
| 3,075,545 | 1/1963 | Eichelman | 137—505.18 |
| 3,149,641 | 9/1964 | Norton | 251—282 XR |
| 3,183,926 | 5/1965 | Boudot | 251—326 XR |

HENRY T. KLINKSIEK, Primary Examiner

U.S. Cl. X.R.

251—282, 326